United States Patent
Chang et al.

(10) Patent No.: US 8,774,133 B2
(45) Date of Patent: Jul. 8, 2014

(54) METHOD OF CELL MEASUREMENT BASED ON CELL RESELECTION AND MEASURED REPORT IN UMTS CELLULAR SYSTEM

(75) Inventors: Chia-Ian Chang, Taipei County (TW); Li-Chi Huang, Taipei Hsien (TW); Ding-Chiang Tang, Taipei City (TW)

(73) Assignee: Mediatek Inc., Hsin-Chu (TW)

( * ) Notice: Subject to any disclaimer, the term of this patent is extended or adjusted under 35 U.S.C. 154(b) by 887 days.

(21) Appl. No.: 12/113,986

(22) Filed: May 2, 2008

(65) Prior Publication Data
US 2009/0274123 A1  Nov. 5, 2009

(51) Int. Cl.
*H04W 4/00*  (2009.01)
*H04B 7/185*  (2006.01)
*H04W 36/00*  (2009.01)

(52) U.S. Cl.
USPC ............ 370/332; 370/318; 455/436; 455/437

(58) Field of Classification Search
USPC ....................................... 370/332
See application file for complete search history.

(56) References Cited

U.S. PATENT DOCUMENTS

| | | | |
|---|---|---|---|
| 6,330,459 B1 * | 12/2001 | Crichton et al. | 455/562.1 |
| 7,013,141 B2 * | 3/2006 | Lindquist et al. | 455/435.1 |
| 7,110,765 B2 | 9/2006 | Amerga et al. | |
| 7,254,118 B1 * | 8/2007 | Terasawa et al. | 370/328 |
| 7,853,260 B2 * | 12/2010 | Holma et al. | 455/443 |
| 2002/0037721 A1 * | 3/2002 | Tu et al. | 455/434 |
| 2003/0218995 A1 * | 11/2003 | Kim et al. | 370/318 |
| 2004/0005890 A1 | 1/2004 | Holma et al. | |
| 2004/0029532 A1 * | 2/2004 | Schwarz et al. | 455/63.1 |
| 2005/0272425 A1 * | 12/2005 | Amerga et al. | 455/436 |
| 2006/0111110 A1 * | 5/2006 | Schwarz et al. | 455/439 |
| 2008/0181127 A1 * | 7/2008 | Terry et al. | 370/252 |
| 2009/0040955 A1 * | 2/2009 | Jung et al. | 370/311 |
| 2009/0197598 A1 * | 8/2009 | Fischer | 455/434 |

\* cited by examiner

*Primary Examiner* — Noel Beharry
(74) *Attorney, Agent, or Firm* — McClure Qualey & Rodack, LLP (57) ABSTRACT

A cell measurement method used in a mobile station camping on a serving cell is provided, wherein the serving cell sends system information of neighbor cells to the mobile station. A first set of the neighbor cells is determined based on a measurement rule for cell reselection. A second set of the neighbor cells is determined based on a report request for radio link establishment. A subset is chosen from the second set. Finally, the neighbor cells of a union of the first set and the subset are measured.

11 Claims, 10 Drawing Sheets

METHOD OF CELL MEASUREMENT BASED ON CELL RESELECTION AND MEASURED REPORT IN UMTS CELLULAR SYSTEM

BACKGROUND OF THE INVENTION

1. Field of the Invention

The invention relates to a system and method for cell measurement in a Universal Mobile Telecommunications System (UMTS), and more particularly to a system and method for cell measurement a UMTS based on cell reselection and report requirement.

2. Description of the Related Art

In current Universal Mobile Telecommunications System (UMTS) cellular system design, measurement for cell reselection is based on a measurement rule. However, system information of a serving cell can also carry an additional cell measurement and send a "report on Random Access Channel (RACH)". Thus, when both are simultaneously performed, the measurement configuration is undefined.

According to the $3^{rd}$ generation partnership project (3GPP) specification, cell measurement should be based on a signal strength and/or quality of a serving cell. Normally, thresholds are established by system information of the cell via a Broadcast Control Channel (BCCH). The 3GPP specification allows the measurement target to be decided dynamically after comparing thresholds with the measurement result of the serving cell, in order to reduce measurement burden for a mobile station and prioritize a candidate cell during a cell reselection procedure.

Additionally, the 3GPP specification also defines a rule for "measured results on RACH". The 3GPP specification requires the user equipment (UE) to report the measurement result for one or more cells, by system information of the cell via the BCCH. However, the 3GPP specification does not mention or comment on the correlation between the two rules.

BRIEF SUMMARY OF THE INVENTION

The invention provides a cell measurement method used in a mobile station camping on a serving cell, wherein the serving cell sends system information of neighbor cells to the mobile station. A first set of the neighbor cells is determined based on a measurement rule for cell reselection, a second set of the neighbor cells is determined based on a report request for radio link establishment, a subset is chosen from the second set, wherein the subset has fewer cells than the second set, and the neighbor cells of a union of the first set and the subset are measured.

The invention also provides another cell measurement method used in a mobile station camping on a serving cell. The serving cell sends system information of neighbor cells to the mobile station. Firstly, a first set of the neighbor cells is determined based on a measurement rule for cell reselection. Next, a second set of the neighbor cells is determined based on a report request for radio link establishment, wherein the first set partially overlaps the second set, and the neighbor cells of a union of the first set and the second set are measured.

The invention further provides a cell measurement system comprising an antenna, a transceiver, and a processor. The transceiver coupled to the antenna receives system information of neighbor cells from a serving cell via the antenna. The processor coupled to the transceiver determines a first set of the neighbor cells according to a measurement rule, determines a second set of the neighbor cells according to a report request for radio link establishment, chooses a subset from the second set, wherein the subset has fewer cells than the second set, directs the transceiver to receive signals from the neighbor cells of a union of the first set and the subset via the antenna, and measures the received signals of the neighbor cells of the union.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In Universal Mobile Telecommunications System (UMTS), a mobile station operating in idle mode selects (either automatically or manually) a public land mobile network (PLMN) to contact. The mobile station continuously listens to Broadcast Control Channel (BCCH) to acquire system information. The MS searches for a suitable cell of the chosen PLMN, chooses that cell to provide available services, and configures to its control channel, also referred to as "camping on a cell". After camping on a cell in idle mode, the mobile station can receive system information and cell broadcast messages from a base station. The mobile station stays in idle mode until the mobile station transmits a request to establish a Radio Resource Control (RRC) connection.

In the Cell_DCH state of connected mode, a dedicated physical channel is allocated to the mobile station, and the mobile station is known by its serving radio network controller (RNC) on a cell or active set level. The mobile station performs measurements and sends measurement reports according to measurement control information received from RNC. The mobile station with certain capabilities monitors the Forward Access Channel (FACH) for system information messages. In the Cell_FACH state of connected mode, no dedicated physical channel is allocated for the mobile station, but Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection typically sends a Cell Update message to the RNC, so that the RNC knows the mobile station location on a cell level. In the Cell_PCH state of connected mode, the mobile station is known on a cell level in Serving Radio Network Controller (SRNC), but the mobile station can be reached only via the Paging Channel (PCH). The URA_PCH state of connected mode is very similar to the Cell_PCH state, except that the mobile station does not execute Cell Update after each cell reselection, but instead reads UMTS Terrestrial Radio Access Network (UTRAN) Registration Area (URA) identities from the BCH, and only if the URA changes (after cell reselection) does the mobile station inform its location to the SRNC. The mobile station leaves connected mode and returns to idle mode when the RRC connection is released or at RRC connection failure.

Figure 1:
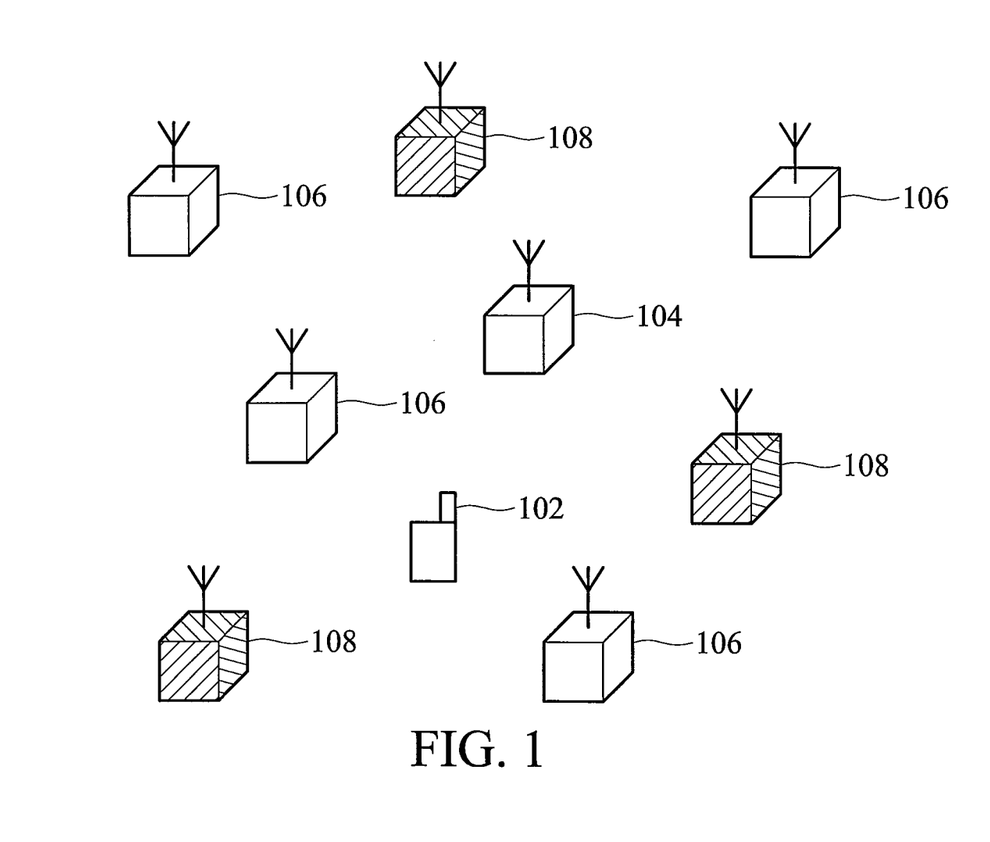
FIG. 1 shows an example of a UMTS cellular system.

FIG. 1 shows an example of a UMTS cellular system, and a mobile station 102 camped on a serving cell 104. The serving cell 104 can send system information of its neighbor cells, including intra-frequency cells 106 and inter-frequency cells 108, to the mobile station 102. The intra-frequency cells 106 share the same carrier frequency as the serving cell 104, while the inter-frequency cells 108 have another carrier frequency different from that of the serving cell 104. The mobile station 102 can distinguish the serving cell 104 and the intra-frequency cells 106 by their corresponding codes. The frequency band of the serving cell 104 contains many logical channels such as RACH and BCCH, which can be distinguished by their corresponding codes assigned by the serving cell 104. When the mobile station 102 firstly camps on the serving cell 104, the system information indicating the neighbor cells will be transmitted to the mobile station 102 via BCCH. Moreover, the system information can further contain a measurement rule for cell reselection and a report request for radio link establishment.

The measurement rule defines which neighbor cells are needed to be measured by the mobile station when no radio link is established between the mobile station and the serving cell (e.g. the mobile station is in an idle mode). For example, two thresholds, $S_{intrasearch}$ and $S_{intersearch}$, for the measurement rule are described as follows. When the signal strength $S_{rxlev}$ and/or quality $S_{qual}$ of the serving cell are/is better than $S_{intrasearch}$, the mobile station will only measure the serving cell. When $S_{rxlev}$ and/or $S_{qual}$ of the serving cell are/is worse than $S_{intrasearch}$ but better than $S_{intersearch}$, the mobile station will measure the serving cell and the intra-frequency cells. When $S_{rxlev}$ and/or $S_{qual}$ of the serving cell are/is worse than $S_{intersearch}$, the mobile station will measure the serving cell, the intra-frequency cells, and the inter-frequency cells. Furthermore, the mobile station can periodically measure the neighbor cells according to the measurement rule, and then execute a cell reselection evaluation process based on measure results for the measured cells. In the cell reselection evaluation process, the mobile station can select one neighbor cell having the strongest signal strength/quality from the measured cells as a new serving cell when the signal strength/quality of the serving cell is worse than a reselection threshold.

When one or more radio links (e.g. dedicated channels) are to be established between the mobile station and the serving cell (e.g. the mobile station is trying to initiate a telephone call), the mobile station may be required to send a report on RACH if the report request is received from the serving cell. The report request is used to require the mobile station to report additional system information of the intra-frequency cells for the radio link establishment, because the RNC may not only assign the radio link of the serving cell to the mobile station but also the radio links of the intra-frequency cells for better link performance. For example, the report request may require the mobile station to report two intra-frequency cells with the best two signal strengths/qualities. However, the report request may not require the mobile station to send any measurement of the intra-frequency cells, and therefore the mobile station will not send the report on RACH for the radio link establishment accordingly.

Figure 2:
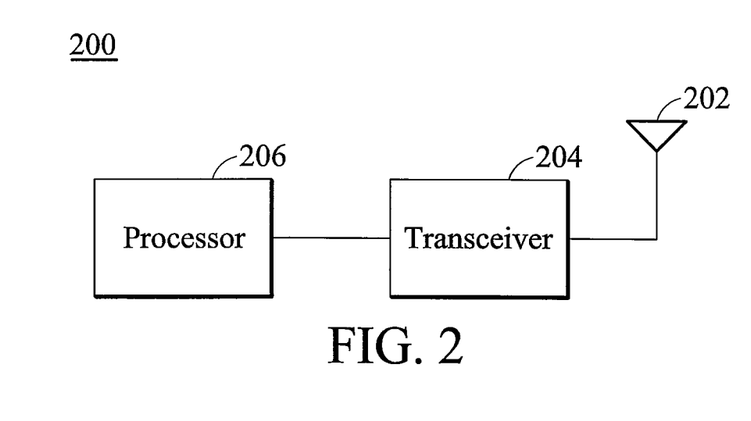
FIG. 2 is an embodiment of the cell measurement system according to the invention.

FIG. 2 is an embodiment of a system of the cell measurement according to the invention. A mobile station 200 comprises an antenna 202, a transceiver 204, and a processor 206. The transceiver 204 is coupled to the antenna 202, and the processor 206 is coupled to the transceiver 204. The processor 206 accompanying with the transceiver 204 may receive system information including a neighbor cell profile, a measurement rule for cell reselection, and a report request for radio link establishment from a serving cell (not shown) via the antenna 202. The processor 206 may determine whether a report on RACH is required according to the report request. When the report on RACH is required, the processor 206 may determine a set $C_M$ of the neighbor cells according to the measurement rule, determine a set $C_R$ of the neighbor cells according to the report request, and choose a subset $C_{R'}$ from the set $C_R$. After the set $C_M$ and the set $C_{R'}$ are determined, the processor 206 may direct the transceiver 204 to receive signals from the neighbor cells of a set $C_T = C_M \cup C_{R'}$, via the antenna 202, and measure the received signals of the neighbor cells of the set $C_T$. The processor 206 may subsequently execute a cell reselection evaluation process based on the set $C_M$, and direct the transceiver 204 to send the report on RACH based on the set $C_{R'}$ via the antenna 202 when a radio link is required to be established. Note that the processor 206 may direct the transceiver 204 to receive the signals sent from the neighbor cells at each measurement occasion. The time when the processor 206 starts to measure the neighbor cells can be referred to as a measurement occasion. The time interval between two measurement occasions is a constant interval. However, not every neighbor cell is required to be measured at each measurement occasion. For example, one neighbor cell can be measured every two measurement occasions. The periodic interval that the processor 206 starts to measure the broadcasting signal of the neighbor cell can be referred to as a measurement period corresponding to the neighbor cell. In one embodiment, the processor 206 can determine measurement periods each corresponding to the neighbor cells of $C_R$, and periodically measure the signal quality/strength of broadcasting signals of the neighbor cells in $C_R$ according to their corresponding measurement periods. Accordingly, the processor 206 can determine which neighbor cell in $C_R$ is required to be measured at a measurement occasion according to its corresponding measurement period, and choose the neighbor cell(s) required to be measured at the measurement occasion as $C_{R'}$.

Figure 3:
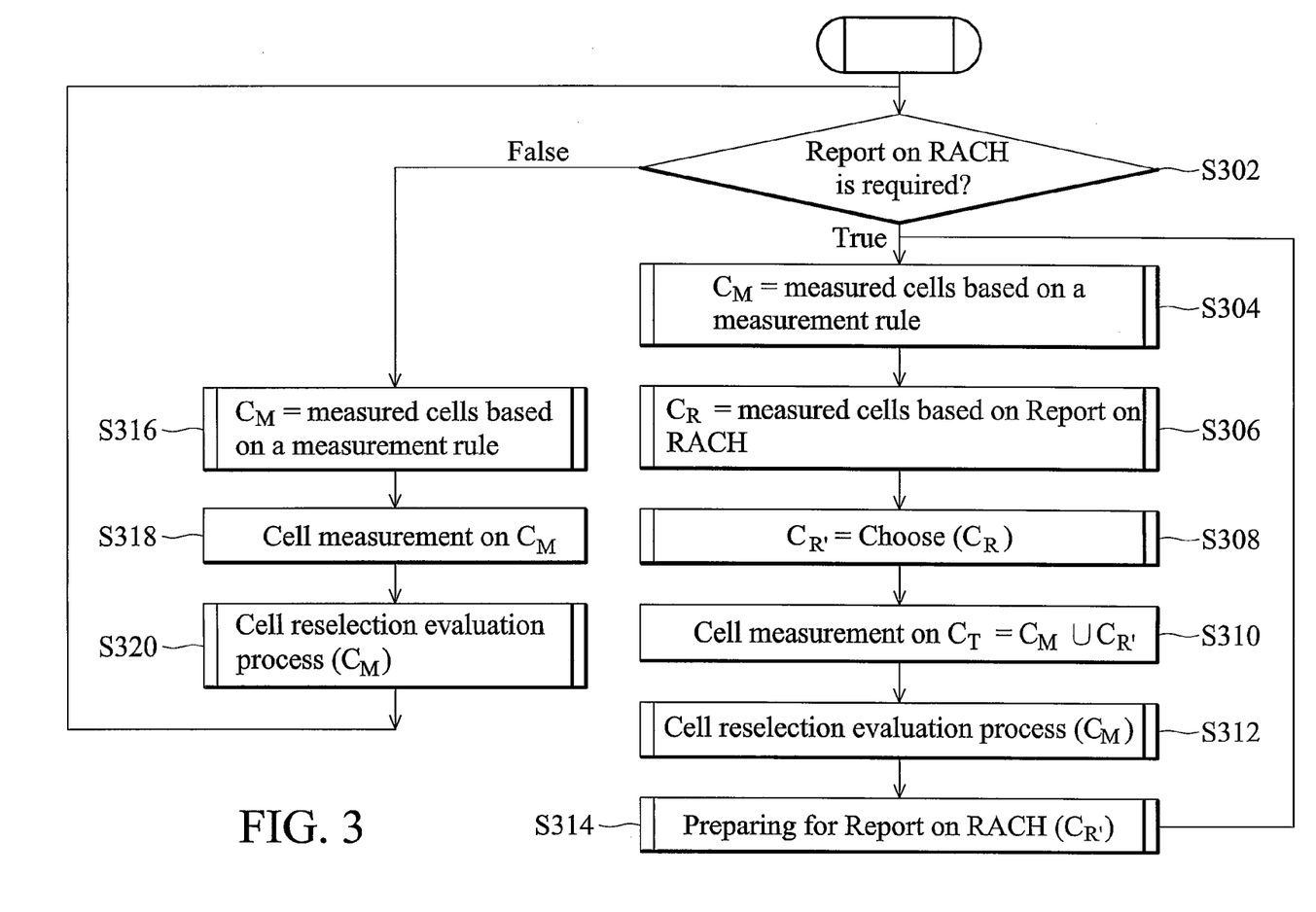
FIG. 3 is an embodiment of the cell measurement method according the invention.

FIG. 3 is an embodiment of a cell measurement method according the invention, wherein the cell measurement method can be performed by a mobile station in a UMTS cellular system. The mobile station is camped on a serving cell, and the serving cell can send system information indicating neighbor cells including intra-frequency cells and inter-frequency cells, a measurement rule for cell reselection, and a report request for radio link establishment to the mobile station. Firstly, the mobile station may determine whether a report on RACH for the neighbor cells is required according to the report request (S302). When the report on RACH is required, a set $C_M$ of the neighbor cells is determined based on the measurement rule (S304). For example, the measurement rule may determine the set $C_M$ as the serving cell when the signal quality of the serving cell is better than a first threshold (e.g., $S_{intrasearch}$), determine the set $C_M$ as a union of the serving cell and the intra-frequency cells when the signal quality is worse than the first threshold and better than a second threshold (e.g., $S_{intersearch}$), or determine the set $C_M$ as a union of the serving cell, the intra-frequency cells, and the inter-frequency cells when the signal quality is worse than the second threshold. Next, a set $C_R$ of the neighbor cells is also determined based on the report on RACH (S306). For example, the report request may require the mobile to send the report on RACH, and the report on RACH can comprise a neighbor cell profile including one or more intra-frequency cells having the best signal qualities/strengths among all intra-frequency cells. Next, a set $C_R$ of the neighbor cells is also determined based on the report request (S306). For example, the report request may require the mobile station to send the report on RACH, and the report on RACH can comprise a neighbor cell profile including one or more intra-frequency cells having the best signal qualities/strengths among all intra-frequency cells having the best signal qualities/strengths in the set $C_{R'}$. The number of intra-frequency cells in the neighbor cell profile can be determined by the received report request. On the contrary, when the report on RACH is not required, the set $C_M$ is determined based on the measurement rule (S316), and only the neighbor cells of the set $C_M$ are measured (S318). Finally, the cell reselection evaluation process is executed based on the set $C_M$ (S320), and then reverts back to step S302.

Figure 4:
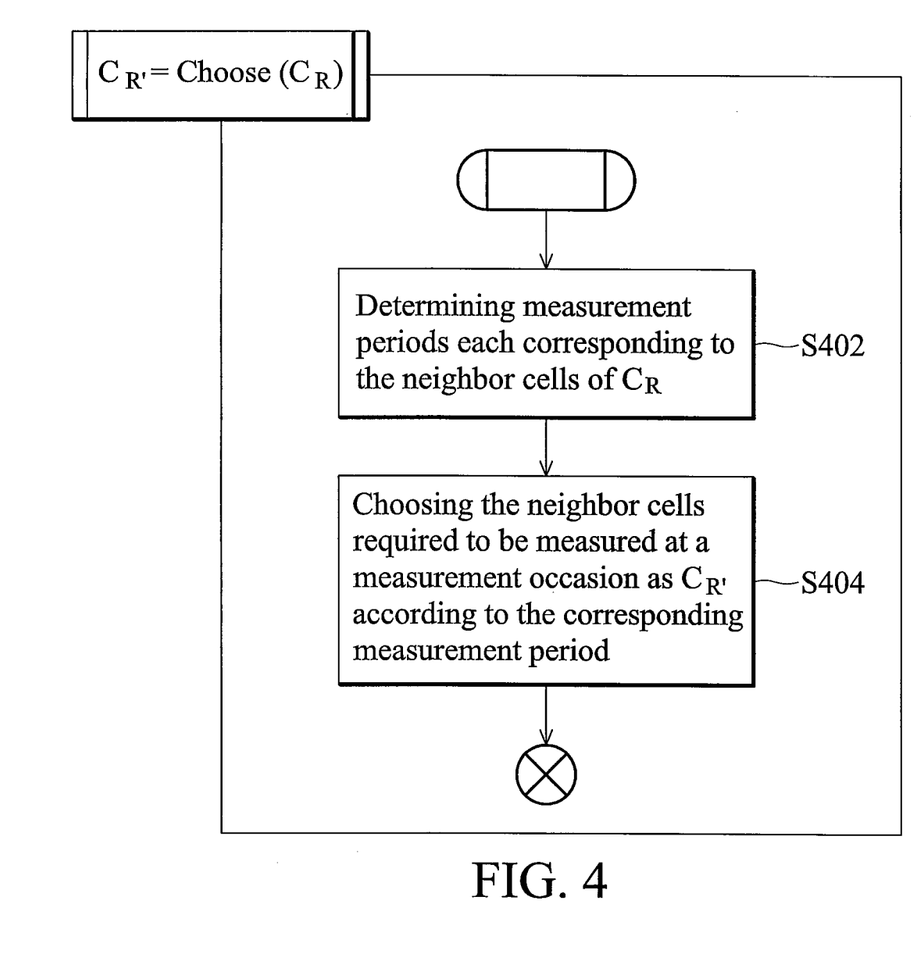
FIG. 4 shows more details on how the subset $C_{R'}$ in the step S308 of FIG. 3 is chosen.
Figure 5:
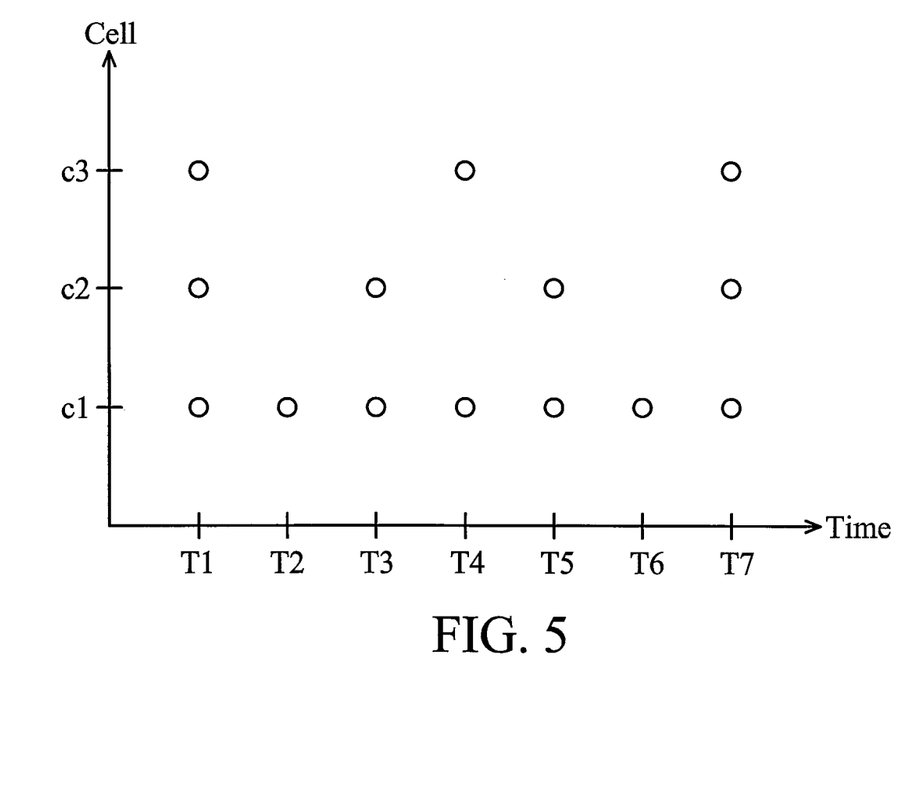
FIG. 5 shows an example of a timing diagram of FIG. 4.

FIG. 4 shows more details on how the subset $C_{R'}$ in the step S308 of FIG. 3 is chosen. Firstly, measurement periods each corresponding to the neighbor cells of $C_R$ are determined (S402), so the broadcasting signals of the neighbor cells of $C_R$ can be periodically measured according to their corresponding measurement periods. The measurement period corresponding to one neighbor cell is a periodic interval that the mobile station starts to measure the signal strength/quality of the broadcasting signal of the neighbor cell. It is noted that each measurement period can be a multiple of the discontinuous reception (DRX) cycle length. In UMTS, the mobile station may use discontinuous reception (DRX) in idle mode in order to reduce power consumption. When DRX is used the mobile station needs only to monitor one Page Indicator (PI) in one Paging Occasion per DRX cycle. During the DRX cycle length, each mobile station performing power saving may typically wake up only during its own PI interval to check up a paging message. The mobile station decides whether to sleep again by checking the PI and monitoring the paging message. For example, after receiving the DRX cycle length coefficient k by the system information broadcast, the DRX cycle length is determined by MAX($2^k$, PBP) frames, where k is an integer and PBP is the paging block periodicity. Next, the subset $C_{R'}$ can be chosen from the set $C_R$ according to the corresponding measurement periods (S404). FIG. 5 shows an example of a timing diagram of FIG. 4, where time T1-T7 are measurement occasions of the mobile station to measure the neighbor cells, and the set $C_R=\{c1, c2, c3\}$. The time interval of each measurement occasion T1-T7 is the DRX cycle length. In this example, the corresponding measurement periods of the intra-frequency cells c1, c2, and c3 are respectively assigned as one, two, and three DRX cycle lengths. Initially, at the measurement occasion T1, the intra-frequency cells c1, c2, and c3 are required to be measured, so the subset $C_{R'}$ is chosen as $\{c1, c2, c3\}$. At the measurement occasion T2, only the intra-frequency cell c1 is required to be measured, so the subset $C_{R'}$ is chosen as $\{c1\}$. At the measurement occasion T3, the intra-frequency cells c1 and c2 are required to be measured, so the subset $C_{R'}$ is chosen as $\{c1, c2\}$. At the measurement occasion T4, the cells c1 and c3 are required to be measured, so the subset $C_{R'}$ is chosen as $\{c1, c3\}$. Note that the subset $C_{R'}$ can be easily chosen according to the corresponding measurement periods of the intra-frequency cells in the set $C_R$, and therefore the burden of the cell measurement at each measurement occasion can be reduced.

Figure 6:
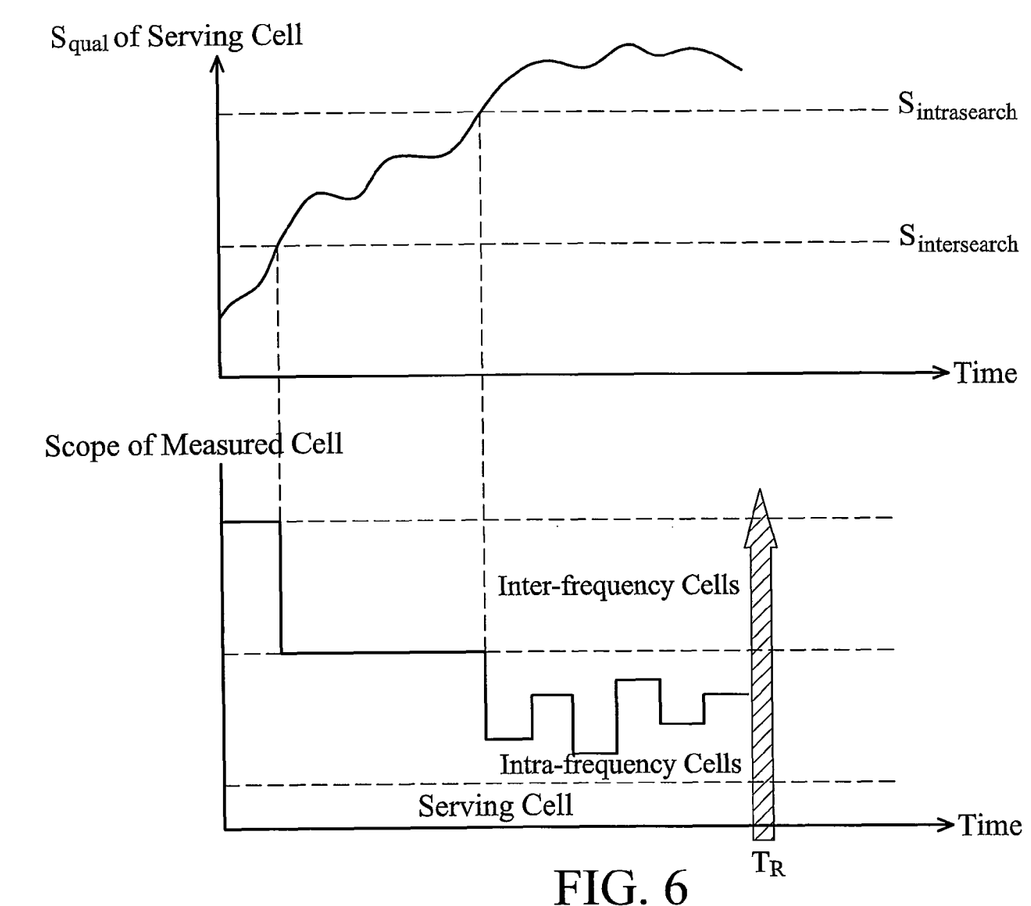
FIG. 6 shows an example of a relationship between the signal quality of the serving cell and the scope of measured cells in the method of FIG. 3.

FIG. 6 shows an example of a relationship between the signal quality $S_{qual}$ of the serving cell and the scope of measured cells in the method of FIG. 3. The curve in the upper part represents the signal quality $S_{qual}$ of the serving cell, while the curve in the lower part represents the set $C_T$. When $S_{qual}$ of the serving cell is worse than $S_{intersearch}$, the set $C_M$ includes the inter-frequency cells, the intra-frequency cells, and the serving cell, so the set $C_T$ is set equal to the set $C_M$. When the $S_{qual}$ of the serving cell is worse than $S_{intrasearch}$ but better than $S_{intersearch}$, the set $C_M$ includes the intra-frequency cells and the serving cell, and therefore the set $C_T$ is also set equal to the set $C_M$. When the $S_{qual}$ of the serving cell is better than $S_{intrasearch}$, the set $C_M$ only includes the serving cell, and therefore the set $C_T$ is set equal to $C_M \cup C_{R'}$. When one or more radio links are required to be established at time $T_R$, the mobile station will send the report on RACH to the serving cell according to the report request. Note that the number of the neighbor cells required to be reported may be greater than the number of the neighbor cells actually reported by the mobile station, because very weak signal strengths may not be able to be measured by the mobile station.

Figure 7:
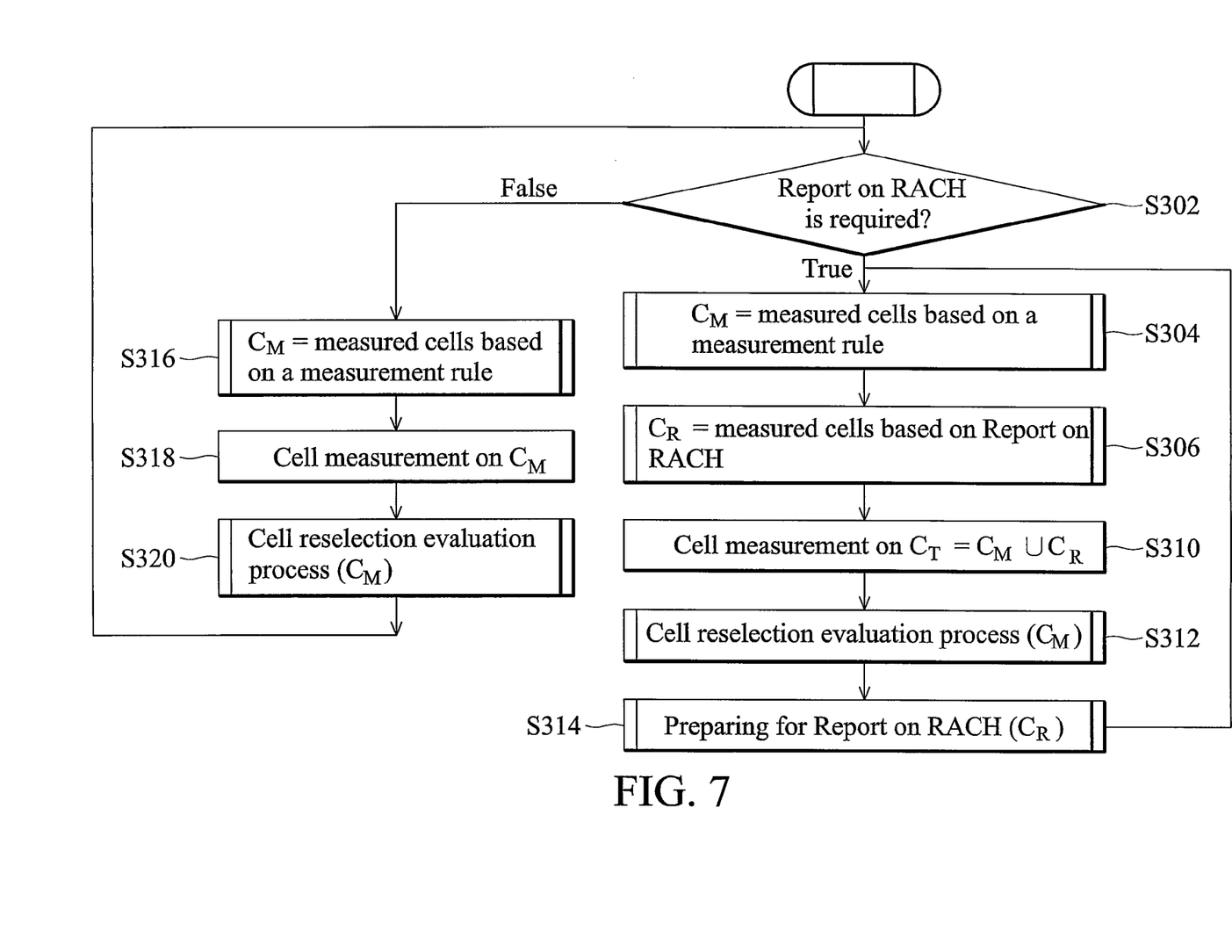
FIG. 7 is a modified embodiment of the cell measurement method described in FIG. 3.
Figure 8:
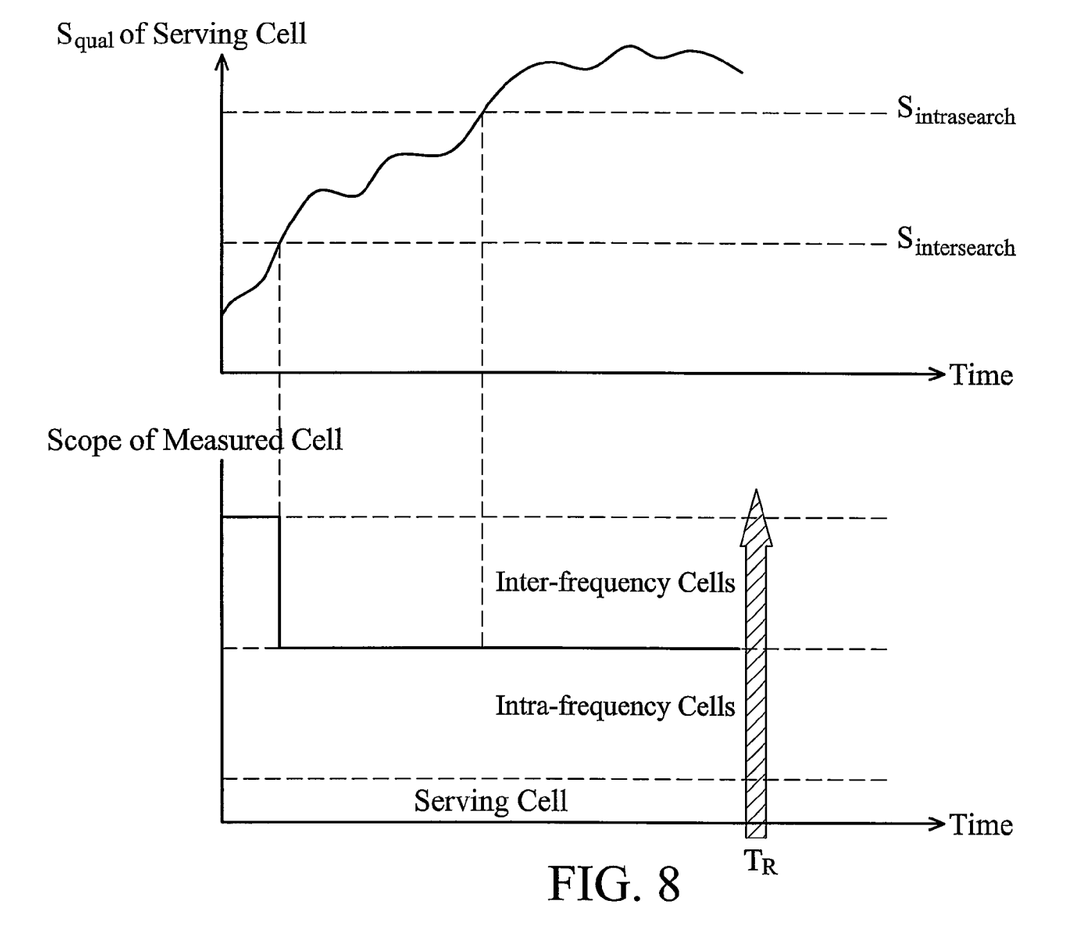
FIG. 8 shows an example of a relationship between the signal quality of the serving cell and the scope of measured cells in the method of FIG. 7.

FIG. 7 is a modified embodiment of the cell measurement method described in FIG. 3. Different from FIG. 3, the cell measurement method in FIG. 7 does not choose the subset $C_{R'}$ from the set $C_R$ (i.e., the step S308 is removed). In other words, the subset $C_{R'}$ is chosen as the set $C_R$, and the set $C_T$ in S310 becomes a union of the set $C_M$ and the set $C_R$ (i.e. $C_T=C_M \cup C_R$). FIG. 8 shows an example of a relationship between the signal quality of the serving cell and the scope of measured cells in the method of FIG. 7. The curve in the upper part represents the signal quality $S_{qual}$ of the serving cell, while the curve in the lower part represents the set $C_T$. In this embodiment, the set $C_R$ includes all the intra-frequency cells. When the $S_{qual}$ of the serving cell is worse than $S_{intersearch}$, the set $C_M$ includes the inter-frequency cells, the intra-frequency cells, and the serving cell, so the set $C_T$ is set equal to the set $C_M$. When the $S_{qual}$ of the serving cell is worse than $S_{intrasearch}$ but better than $S_{intersearch}$, the set $C_M$ includes the intra-frequency cells and the serving cell, and therefore the set $C_T$ is also set equal to the set $C_M$. When the $S_{qual}$ of the serving cell is better than $S_{intrasearch}$, the set $C_M$ only includes the serving cell but the set $C_R$ includes the intra-frequency cells, so the set $C_T$ as a union includes the serving cell and the intra-frequency cells. Although the set $C_R$ includes all the intra-frequency cells in this embodiment, the set $C_R$ may only include the best 1~6 intra-frequency cell(s) in other embodiments. When one or more radio links are required to be established at time $T_R$, the mobile station will send the report on RACH to the serving cell according to the report request.

Figure 9:
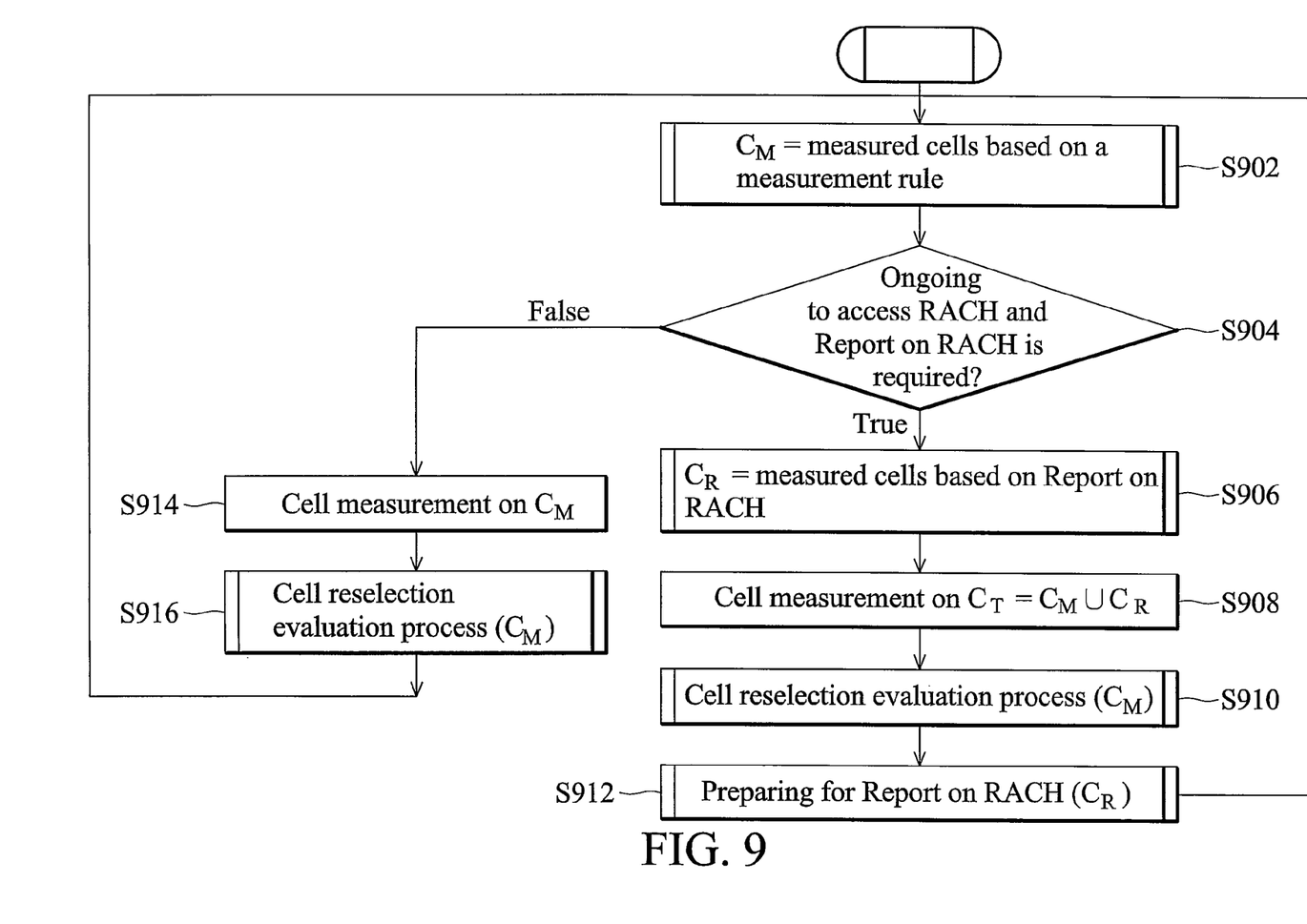
FIG. 9 is another embodiment of the cell measurement method according the invention.

FIG. 9 is another embodiment of the cell measurement method used in a mobile station according the invention. Firstly, a set $C_M$ is determined based on a measurement rule for cell reselection (S902). When a radio link is required to be established and a report on RACH for radio link establishment is required according to the report request (S904), a set $C_R$ is determined based on the report request (S906), and the neighbor cells of a set $C_T$, i.e. a union of the set $C_M$ and the set $C_R$, are measured (S908). Next, a cell reselection evaluation process is executed based on the set $C_M$ (S910), and the report on RACH is sent based on the set $C_R$ (S912), and then reverted back to step S902. On the contrary, when a radio link is not required to be established and a report on RACH is not required, only the neighbor cells of the set $C_M$ are measured (S914), and the cell reselection evaluation process is executed based on the set $C_M$ (S916), and then reverted back to step S902.

Figure 10:
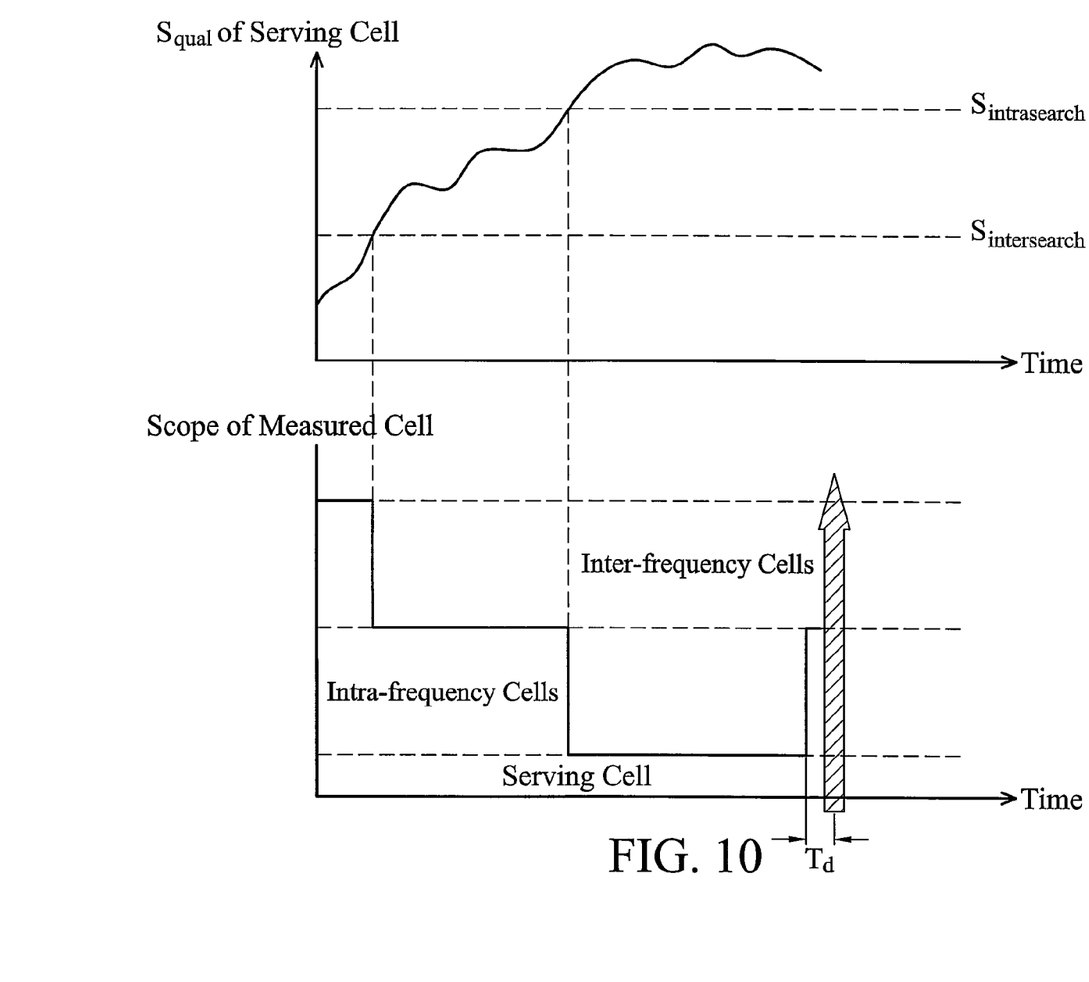
FIG. 10 shows an example of a relationship between the signal quality of the serving cell and the scope of measured cells in the method of FIG. 9.

FIG. 10 shows an example of a relationship between the signal quality of the serving cell and the scope of measured cells in the method of FIG. 9. The curve in the upper diagram represents the signal quality $S_{qual}$ of the serving cell, while the curve in the lower diagram represents the set $C_T$. When one or more radio links are not to be established or the report on RACH is not required, the mobile station will measure the neighbor cells only based on the measurement rule. Once the radio links are required to be established and the report on RACH is also required, the mobile station will measure the neighbor cells based on both the measurement rule and the report on RACH, and then send the measurement results via RACH to the serving cell with a time delay $T_d$. The time delay $T_d$ results from additional measurement time of the intra-frequency cells when the set $C_M$ only includes the serving cell.

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. A cell measurement method used in a mobile station camping on a serving cell, wherein the serving cell sends system information of neighbor cells to the mobile station, comprising:
    determining a first set of the neighbor cells based on a measurement rule for cell reselection, wherein the measurement rule defines which neighbor cells are needed to be measured when no radio link is established between the serving cell and the mobile station;
    determining a second set of the neighbor cells based on a report request for radio link establishment, wherein the report request is required to be sent when a dedicated channel is to be established between the serving cell and the mobile station;
    choosing a subset from the second set, wherein the subset is less than the second set; and
    measuring the neighbor cells of a union of the first set and the subset,
    wherein the neighbor cells of the union are measured when a report on Random Access Channel (RACH) is required according to the report request;
    wherein the cell measurement method further comprises sending the report on RACH including a measurement result of the neighbor cells of the subset to the serving cell when a radio link is required to be established;
    wherein the subset is chosen by assigning each of the neighbor cells of the second set a corresponding measurement period and choosing the subset from the second set according to the corresponding measurement periods; and
    wherein each of the corresponding measurement periods is a multiple of a discontinuous reception (DRX) cycle length.

2. The cell measurement method as claimed in claim 1, further comprising measuring the neighbor cells of the first set when the report on RACH is not required.

3. The cell measurement method as claimed in claim 1, wherein the subset is chosen as the second set.

4. The cell measurement method as claimed in claim 1, further comprising selecting one neighbor cell having the strongest signal strength in the first set as a second serving cell when a signal quality of the serving cell is worse than a reselection threshold.

5. The cell measurement method as claimed in claim 1, wherein the DRX cycle length is determined by MAX($2^k$, PBP) frames, wherein k is an integer of a DRX cycle length coefficient, and PBP is a paging block periodicity.

6. A cell measurement system accompanying with an antenna and a transceiver coupled to the antenna, wherein the transceiver is configured to receive system information of neighbor cells from a serving cell via the antenna, comprising:
    a processor, coupled to the transceiver, configured to determine a first set of the neighbor cells according to a measurement rule for cell reselection, determine a second set of the neighbor cells according to a report request for radio link establishment, choose a subset from the second set, wherein the subset is less than the second set, direct the transceiver to receive signals from the neighbor cells of a union of the first set and the subset via the antenna, and measure the received signals of the neighbor cells of the union,
    wherein the measurement rule defines which neighbor cells are needed to be measured when no radio link is established between the serving cell and the mobile station, and the report request is required to be sent when a dedicated channel is to be established between the serving cell and the mobile station,
    wherein the processor is further configured to assign each of the neighbor cells of the second set a corresponding measurement period and periodically measure the neighbor cells of the second set according to the corresponding measurement periods; and
    wherein each of the corresponding measurement periods is a multiple of a discontinuous reception (DRX) cycle length.

7. The cell measurement system as claimed in claim 6, wherein the processor is further configured to determine the first set of the neighbor cells based on the measurement rule and measure the neighbor cells of the first set when a report on Random Access Channel (RACH) is not required according to the report request.

8. The cell measurement system as claimed in claim 6, wherein the processor is further configured to determine the neighbor cells of the second set required to be measured at a measurement occasion according to the corresponding measurement periods, and choose the neighbor cells required to be measured as the subset from the second set.

9. The cell measurement system as claimed in claim 8, wherein the processor is further configured to send a report on Random Access Channel (RACH) including a measurement result of the neighbor cells of the subset to the serving cell when a radio link is required to be established.

10. The cell measurement system as claimed in claim 6, wherein the processor is further configured to select one neighbor cell having the strongest signal strength in the first set as a second serving cell when a signal quality of the serving cell is worse than a reselection threshold.

11. The cell measurement system as claimed in claim 6, wherein the DRX cycle length is determined by MAX($2^k$, PBP) frames, wherein k is an integer of a DRX cycle length coefficient, and PBP is a paging block periodicity.

* * * * *